United States Patent
Nakarmi et al.

(10) Patent No.: US 11,930,422 B2
(45) Date of Patent: Mar. 12, 2024

(54) SUPPORTING POSITIONING

(71) Applicant: Telefonaktiebolaget LM Ericsson (publ), Stockholm (SE)

(72) Inventors: Prajwol Kumar Nakarmi, Sollentuna (SE); Åke Busin, Sollentuna (SE); Fredrik Gunnarsson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 296 days.

(21) Appl. No.: 17/422,952

(22) PCT Filed: Jan. 17, 2020

(86) PCT No.: PCT/EP2020/051163
§ 371 (c)(1),
(2) Date: Jul. 14, 2021

(87) PCT Pub. No.: WO2020/148440
PCT Pub. Date: Jul. 23, 2020

(65) Prior Publication Data
US 2022/0150667 A1    May 12, 2022
US 2023/0148449 A9    May 11, 2023

Related U.S. Application Data

(60) Provisional application No. 62/794,132, filed on Jan. 18, 2019.

(51) Int. Cl.
*H04W 64/00* (2009.01)
*H04W 4/029* (2018.01)
*H04W 8/00* (2009.01)

(52) U.S. Cl.
CPC ........... *H04W 4/029* (2018.02); *H04W 8/005* (2013.01); *H04W 64/006* (2013.01)

(58) Field of Classification Search
CPC .... H04W 64/00; H04W 64/003; H04L 67/52; H04B 17/27
See application file for complete search history.

(56) References Cited

U.S. PATENT DOCUMENTS

| | | | |
|---|---|---|---|
| 2002/0174073 A1 | 11/2002 | Nordman et al. | |
| 2005/0140507 A1* | 6/2005 | Nam | G01S 13/751 340/8.1 |
| 2011/0176494 A1* | 7/2011 | Huang | G01S 5/0242 370/329 |

FOREIGN PATENT DOCUMENTS

| | | | |
|---|---|---|---|
| CN | 106461755 A | 2/2017 | |
| EP | 2673999 B1 * | 11/2014 | G01S 5/0036 |

(Continued)

OTHER PUBLICATIONS

International Search Report and Written Opinion of the International Searching Authority for PCT International Application No. PCT/EP2020/051163 dated Feb. 27, 2020.

(Continued)

*Primary Examiner* — Kevin Kim
(74) *Attorney, Agent, or Firm* — Sage Patent Group

(57) ABSTRACT

A method performed by a mobile terminal is provided for supporting positioning of the mobile terminal. The method includes receiving a defined filter pattern from a network node in a communications network or another node of the communications network, discovering identities of a plurality of reference devices based on signals received from the plurality of reference devices, filtering the identities of the plurality of reference devices to obtain a subset of identities of the plurality of reference devices that each satisfy the defined filter pattern, and reporting information on the subset of the identities of the plurality of reference devices to the network node.

20 Claims, 15 Drawing Sheets

(56) References Cited

FOREIGN PATENT DOCUMENTS

| JP | 2005-189225 | A | 7/2005 |
|---|---|---|---|
| JP | 2009-017049 | A | 1/2009 |
| JP | 2015-139115 | A | 7/2015 |
| JP | 2018-091767 | A | 6/2018 |
| WO | 2011085267 | A2 | 7/2011 |

OTHER PUBLICATIONS

ETSI TS 136 331 V15.3.0, "LTE; Evolved Universal Terrestrial Radio Access (E-UTRA); Radio Resource Control (RRC); Protocol specification (3GPP TS 36.331 version 15.3.0 Release 15)," Oct. 2018, 916 pages.
3GPP TS 23.502 V15.4.1, "3rd Generation Partnership Project; Technical Specification Group Services and System Aspects; Procedures for the 5G System; Stage 2 (Release 15)," Technical Specification, Jan. 2019, 347 pages.
3GPP TS 23.501 V15.4.0, "3rd Generation Partnership Project; Technical Specification Group Services and System Aspects; System Architecture for the 5G System; Stage 2 (Release 15)," Technical Specification, Dec. 2018, 236 pages.
3GPP TS 36.355 V15.2.0, "3rd Generation Partnership Project; Technical Specification Group Radio Access Network; Evolved Universal Terrestrial Radio Access (E-UTRA); LTE Positioning Protocol (LPP) (Release 15)," Technical Specification, Dec. 2018, 220 pages.
3GPP TR 23.731 V16.0.0, "3rd Generation Partnership Project; Technical Specification Group Services and System Aspects; Study on Enhancement to the 5GC LoCation Services (Release 16)," Technical Report, Dec. 2018, 170 pages.
3GPP TR 33.814 V0.1.0, "3rd Generation Partnership Project; Technical Specification Group Services and System Aspects; Study on the security of the enhancement to the 5GC location services (Release 16)," Technical Report, Nov. 2018, 9 pages.
3GPP TS 22.071 V15.0.0, "3rd Generation Partnership Project; Technical Specification Group Services and System Aspects; Location Services (LCS); Service description; Stage 1 (Release 15)," Technical Specification, Jun. 2018, 55 pages.
3GPP TS 38.305 V15.2.0, "3rd Generation Partnership Project; Technical Specification Group Radio Access Network; NG Radio Access Network (NG-RAN); Stage 2 functional specification of User Equipment (UE) positioning in NG-RAN (Release 15)," Technical Specification, Dec. 2018, 69 pages.
Notification of Transmittal of the International Preliminary Report on Patentability for PCT International Application No. PCT/EP2020/ 051163 dated Apr. 7, 2021.
Ericsson et al., "Resolving ENs in Draft CR as a living baseline for 5GS LCS normative work," 3GPP TSG-SA WG3 Meeting #97, Reno (US), Nov. 18-22, 2019, S3-194466, 3 pages.
Office Action dated Nov. 20, 2023 for Chinese Patent Application No. 202080021370.7, 5 pages.
Office Action dated Jan. 19, 2024 for Japanese Patent Application No. 2021-541533, 3 pages.

* cited by examiner

SUPPORTING POSITIONING

CROSS REFERENCE TO RELATED APPLICATIONS

This application is a 35 U.S.C. § 371 national stage application of PCT International Application No. PCT/EP2020/051163 filed on Jan. 17, 2020, which claims the benefit of U.S. Provisional Patent Application Ser. No. 62/794,132, filed on Jan. 18, 2019, the disclosures and content of which are incorporated by reference herein in their entireties.

TECHNICAL FIELD

The present disclosure relates generally to wireless communications systems and, more particularly, to supporting positioning of a mobile terminal.

BACKGROUND

3GPP is the de-facto organization that develops technical specifications (TS) for mobile networks. The technical specifications for generations of mobile networks, namely 2G (GSM/GPRS), 3G (UMTS), 4G (LTE), and 5G, were developed by 3GPP. On a very high level, a 3GPP system includes user equipment 106 (UE, which is also referred to herein as a mobile terminal), and a network 100 that includes a radio access network (RAN) 102, and a core network (CN) 104, shown in FIG. 1. The UE 106 is a mobile device used by a user to wirelessly access the network 100. The RAN 102 includes base stations which provide wireless radio communication to the UE 106 and connecting the UE 106 to the core network 104. The CN 104 includes several types of core network functions which are responsible for various functions such as handling the mobility of the UE 106, interconnecting to data network, packet routing and forwarding, among other responsibilities.

A 3GPP system supports location services (LCS) and provides mechanisms to position UEs in outdoor and indoor environments. Information about a UEs' position may be used by a 3GPP system for internal purposes, by emergency services or value-added services, by the UE itself, or by third party services. For a 5G system, the following technical specifications include LCS information:
  3GPP TS 22.071 V15.0.0, which defines LCS service descriptions and requirements.
  3GPP TS 23.501 V15.4.0 and 3GPP TS 23.502 V15.4.1, which define a LCS functional description, system architecture, and message flows.
  3GPP TS 38.305 V15.2.0, which defines RAN positioning methods, state descriptions, and message flows to support UE Positioning.
  3GPP TS 36.355 V15.2.0, which defines a protocol called LPP (LTE Positioning Protocol) which may be used point-to-point between a location server and a target device.
  3GPP TR 23.731 V13.0.0, which reports a study on enhancing service-based architecture that may be used for location services in the 5G system.
  3GPP TR 33.814 V0.1.0, which reports a study on security of the enhancement to the 5G core location services.

SUMMARY

An object of the present disclosure is to protect privacy of neighboring devices (also referred to herein as reference devices) to a mobile terminal in connection with robust and scalable positioning of the mobile terminal. An aspect of the present disclosure is directed to a method of operating a mobile terminal supporting positioning of the mobile terminal. The method includes receiving a defined filter pattern from a network node in a communications network or another node of the communications network; discovering identities of the plurality of reference devices based on signals received from the plurality of reference devices; filtering the discovered identities of the plurality of reference devices to obtain a subset of identities of the plurality of reference devices that each satisfy the defined filter pattern. The method further includes reporting information on the subset of the identities of the plurality of reference devices to the network node.

According to an embodiment, the method includes collecting a wireless communication signal measurement for each of the reference devices identified in the subset.

According to an embodiment, the method includes checking for receipt of the defined filter pattern from the communications network. The method further includes, responsive to an absence of receipt of the defined filter pattern from the communications network, using at least one default value for the defined filter pattern.

According to an embodiment, the method includes determining a geographic location of the mobile terminal. The method further includes communicating a query containing the geographic location through the communications network toward a map server requesting a listing of known business identifiers proximately located to the mobile terminal. The method further includes a response from the map server containing the listing of known business identifiers. The method further includes generating at least a portion of the defined filter pattern based on the listing of known business identifiers.

Another aspect of the present disclosure is directed to a mobile terminal that includes at least one processor and at least one memory that is connected to the at least one processor and storing program code for supporting positioning of the mobile terminal and that is executed by the at least one processor to perform operations. The operations include receiving a defined filter pattern from a network node in a communications network or another node of the communications network; discovering identities of a plurality of reference devices based on signals received from the plurality of reference devices. The operations can further include filtering the discovered identities of the plurality of reference devices to obtain a subset of identities of the plurality of reference devices that each satisfy the defined filter pattern. The operations can further include reporting information on the subset of the identities of the plurality of reference devices to the network node.

Another aspect of the present disclosure is directed to a computer program product for supporting positioning of a mobile terminal and includes a non-transitory computer readable medium storing program code configured for execution by a processor of a mobile terminal to cause the processor to perform operations. The operations include receiving a defined filter pattern from a network node in a communications network or another node of the communications network; discovering identities of a plurality of reference devices based on signals received from the plurality of reference devices. The operations further include filtering the discovered identities of the plurality of reference devices to obtain a subset of identities of the plurality of reference devices that each satisfy a defined filter pattern.

The operations can further include reporting information on the subset of the identities of the plurality of reference devices to the network node.

The following explanation of potential problems is a present realization as part of the present disclosure and is not to be construed as previously known by others. Some approaches for positioning a mobile terminal may have privacy concerns because positioning the mobile terminal may reveal the owners or other information of neighboring UEs or devices. Some approaches for positioning a mobile terminal may configure the mobile terminal with a "whitelist" so that the mobile terminal only measures WLAN and Bluetooth devices whose "names" are included on the whitelist. However, as a consequence, a network may not be able to collect sufficient information for positioning the mobile terminal due to robustness and scalability problems. Additionally, in some approaches, it may be undesirable for a mobile terminal to use mass-surveillance of neighboring UEs or devices that collects information of the neighboring UEs and devices for the positioning.

Various embodiments described herein can operate to allow mobile terminals to discover identities of reference devices based on signals received from the reference devices. The mobile terminal can filter the identities of the reference devices based on one or more patterns of identifying information to output a subset of identities of the reference devices that each satisfy a defined filter pattern. The mobile terminal can report information on the subset of the identities of the reference devices to a network node. The mobile terminal can receive the defined filter pattern from a network node. As a consequence, privacy of reference devices may be protected, and positioning of the mobile terminal may be robust and scalable.

BRIEF DESCRIPTION OF DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Figure 1:
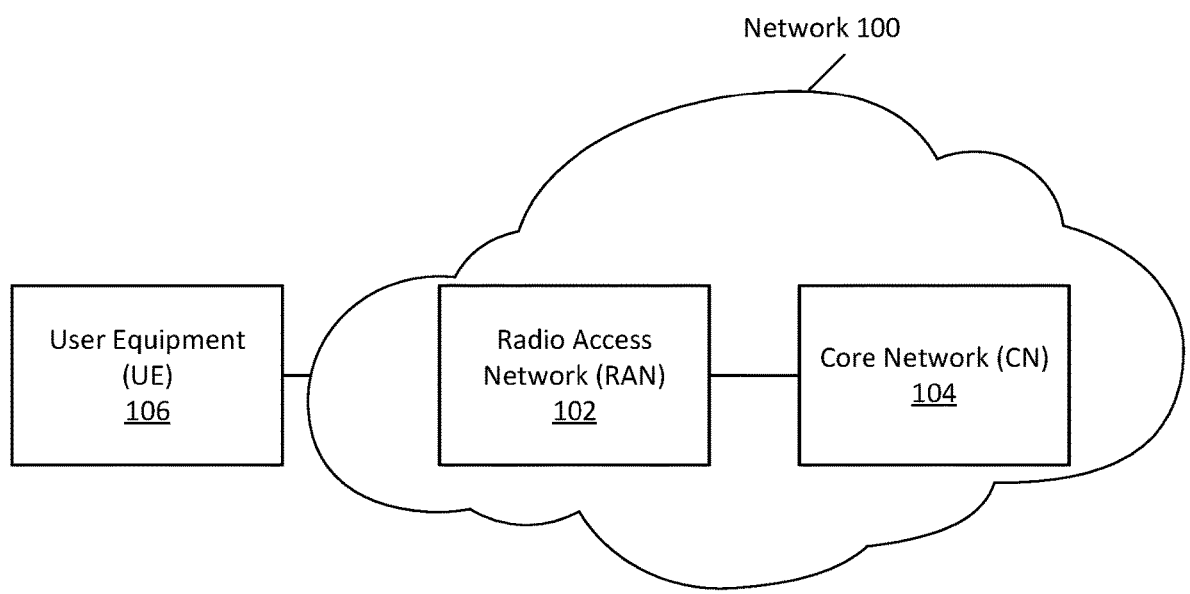
FIG. 1 illustrates a simplified 3GPP system.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter. The term "terminal" is used in a non-limiting manner and, as explained below, can refer to any type of radio communication terminal. The term "terminal" herein may be interchangeable replaced with the term "radio terminal," "radio communication terminal," "radio device," or "user equipment (UE)."

Positioning methods may use 3GPP positioning methods or a combination of 3GPP and non-3GPP positioning methods. Examples of 3GPP positioning methods that may be used include observed time difference of arrival (OTDOA) positioning and an enhanced cell identifier method. Examples of non-3GPP positioning methods that may be used include positioning based on WLAN, Bluetooth, Global Navigation Satellite System (GNSS), Terrestrial Beacon Systems (TBS), and sensors e.g. a barometer.

Approaches to positioning modes may include:

A standalone mode, in which a UE may perform measurements and calculate its own location estimate without assistance from the network.

A UE-Based mode, in which a UE may perform measurements and calculate its own location estimate with assistance from the network.

A UE-Assisted mode, in which a UE may perform measurements with or without assistance from the network and send measurements to the network where the calculation of location estimation takes place.

Privacy is an aspect to consider while positioning a UE because positioning may also position the user or owner of the UE.

One approach to address the privacy of a UE's user or owner may be to use techniques for consent processing to confirm that the UE's user or owner has provided his/her consent to the positioning services before his/her UE may be positioned. Another approach may be to provide confidentiality and integrity protection of messages so that unauthorized parties may not identify or trace users based on messages transmitted over the air.

While these approaches may address privacy of the UE's user or owner, these approaches do not address the privacy of users and owners of neighboring UEs or devices, as further discussed below.

In some positioning modes, such as a UE-Assisted mode, a UE performs measurements of many neighboring UEs or devices and sends those measurements to the network. For example, in a WLAN positioning method, the UE may collect measurements of neighboring WLAN access points (WLAN APs) and send those measurements to the network. For each neighboring access point, the measurements may include one or more of a basic service set identifier (BSSID), a service set identifier (SSID), a received signal strength (RSSI), a time stamp of the time when the measurements were performed by the UE, a UE position estimate, and a position time stamp. Examples of a BSSID include "01:01:01:01:01:01", and/or "02:02:02:02:02:02". Examples of an SSID include "3GPP meeting" and/or "John Doe phone".

In another example, in a Bluetooth positioning method, a UE may collect measurements of neighboring Bluetooth devices and send those measurements to the network. For each neighboring Bluetooth device, the measurements may include a Bluetooth location information, including one or more of a media address control (MAC) address, a device name (also referred to herein as a Local Name), a RSSI, and a time stamp of the time when the measurements were performed by the UE. Examples of a MAC address include "03:03:03:03:03:03" and "04:04:04:04:04:04". Examples of a Local Name include "3GPP Bluetooth" and "John Doe speaker".

In the above examples of WLAN and Bluetooth positioning methods, 3GPP related WLAN and Bluetooth information may be acceptable to send to the network operator because the information may not have a privacy sensitivity. For example, the WLAN and Bluetooth information may not identify any person related to the WLAN or Bluetooth devices. Further, that information may be helpful for the network to calculate the UE's location estimate because the WLAN or Bluetooth device's location may be known to the network. In an example where John Doe is a natural person and owns or operates a UE or device, John Doe may not want or has not given permission for a neighboring UE to collect his information and report to the network that John Doe's UE or device is in the neighborhood. Further, John Doe's information may not be helpful for the network to calculate the reporting UE's location estimate. Furthermore, it may be undesirable for a UE to use mass-surveillance of neighboring UEs or devices in a WLAN or Bluetooth positioning method. For example, such an approach may result in negative public opinion towards the network operator if it appears that the network is using mass-surveillance of neighboring UEs or devices for positioning.

Further Discussion of Potential Problems

Privacy of users or operators of UEs or devices may be a consideration while positioning the UEs. In some approaches, such as UE-Assisted mode, a UE may report information from many UEs or devices proximate to the reporting. This may cause a reporting UE to use mass-surveillance of UEs or devices proximate to the reporting UE. One approach in 3GPP to limit what information is collected by a mobile terminal may be a minimization of drive test (MDT). In an MDT, the network may configure a mobile terminal with a sort of "whitelist" so that the mobile terminal only measures WLAN and Bluetooth devices whose "names" are included in the whitelist. See e.g., "BT-NanneList" and "WLAN-NanneList" in 3GPP TS 36.331 V15.3.0. The BT-NameList may contain a list of Local Names of Bluetooth devices. The WLAN-NameList may contain a list of SSIDs of WLAN devices.

While a whitelist from MDT may be ported to LCS, this approach may not be sufficient. For example, it may be desirable to locate mobile terminals during an emergency. In such a case, failure to locate the mobile terminals may be detrimental to the health or life of the mobile terminals' user or owner. Depending upon regulations, privacy of neighboring WLAN and Bluetooth devices may be considered comparatively less important than e.g. saving the life of the user. Some regulations may obligate neighboring WLAN and Bluetooth devices to assist in locating the concerned mobile terminals. Additionally, some users may opt-in to emergency LCS so that their WLAN and/or Bluetooth devices may be reported to the network.

Using a whitelist of names of devices may cause problems with robustness and scalability. Problems with robustness may occur, e.g., when a network may not be able to collect sufficient information about a neighborhood and then may fail to locate mobile terminals in the neighborhood; or, e.g. if there may be some WLAN and Bluetooth devices in the neighborhood that could help in positioning the mobile terminals, but the names of those neighboring devices were not in the whitelist e.g. due to incorrect naming of those devices (e.g. underscore "_" was used instead of space " "). Problems with scalability may occur, e.g., when a network may not be able to send a large list of names in the whitelist to the mobile terminals. This may happen due to a limitation on the radio resources to send the whitelist to the mobile terminal. For example, in one MDT approach two names each have a value of 4, see e.g. "maxWLAN-Name-r15" and "maxBT-Name-r15" in 3GPP TS 36.331 V15.3.0, meaning that a limit of 4 names of WLAN and Bluetooth devices can be sent to the mobile terminals.

Overview of Presently Disclosed Embodiments

In various embodiments, mobile terminals use one or more patterns to choose which information to measure or report to the network. The mobile terminals may obtain the pattern(s) from the network. The mobile terminals also may obtain the pattern(s) from default or standardized values.

The mass-surveillance and whitelist approaches having robustness and scalability problems may be solved with a mobile terminal that discovers the identities of a plurality of reference devices based on signals received from the reference devices. Although various embodiments are explained below in the non-limiting context of reference devices that are WLAN APs or Bluetooth devices, the invention is not so limited. Reference devices may include without limitation, WLAN access points, Bluetooth, mobile terminals acting as access points, Terrestrial Beacon System (TBS) or other beacon transmitters. The mobile terminal filters the discovered identities of the reference devices to obtain a subset of identities of the reference devices that each satisfy a defined filter pattern. The mobile terminal reports information on the subset of the identities of the plurality of reference devices to a network node. Moreover, the mobile terminal may collect wireless communication signal measurements for each of the reference devices identified in the subset. The mobile terminal may receive the defined filter pattern from the positioning network node or another node of the network. The mobile terminal also may check for receipt of the defined filter pattern from the communications network. Responsive to the absence of receipt of the defined filter pattern, the mobile terminal may use at least one default value for the defined filter pattern.

In some embodiments, the mobile terminal determines a geographic location of the mobile terminal, and communicates a query containing the geographic location to a map server requesting a listing of known business identifiers proximately located to the mobile terminal. The mobile terminal receives a response from the map server containing the listing of known business identifiers, and generates at least a portion of the defined filter pattern based on the listing of known business identifiers.

Potential Advantages of Present Embodiments

Presently disclosed embodiments may operate to allow mobile terminals to use one or more patterns to choose which information to measure or report to the network. The mobile terminals also may use a pattern so that the mobile terminals are not restricted in reporting their neighboring devices and/or can cover a large number of neighboring devices' names.

Various Presently Disclosed Embodiments

In the standalone positioning mode, the mobile terminal itself does the computation of location estimate. WLAN or Bluetooth measurements around the mobile terminals are not sent from mobile terminals to the network. Hence, there is no supervision needed for neighboring reference devices.

In the mobile terminal-based positioning mode, the mobile terminal that itself does the computation of location estimate using assistance data from the network. Nevertheless, WLAN or Bluetooth measurements around the mobile terminals are not sent from mobile terminals to the network. Hence, there is no supervision needed for neighboring reference devices.

In the mobile terminal-assisted positioning mode, the network does the computation of location estimate and WLAN or Bluetooth measurements around the mobile terminals are sent from mobile terminals to the network. The mobile terminals optionally get assistance data from the network. In this mode, there is a need of some form of supervision so that unintended WLAN or Bluetooth measurements around the mobile terminals are not sent from mobile terminals to the network.

In some embodiments, for the positioning modes requiring a mobile terminal to send WLAN or Bluetooth measurements to the network (e.g., mobile terminal-assisted), the mobile terminal uses one or more patterns to choose which information to measure or report to the network. The mobile terminal obtains the pattern(s) from the network. The mobile terminal also may obtain the pattern(s) from default or standardized values.

Figure 2:
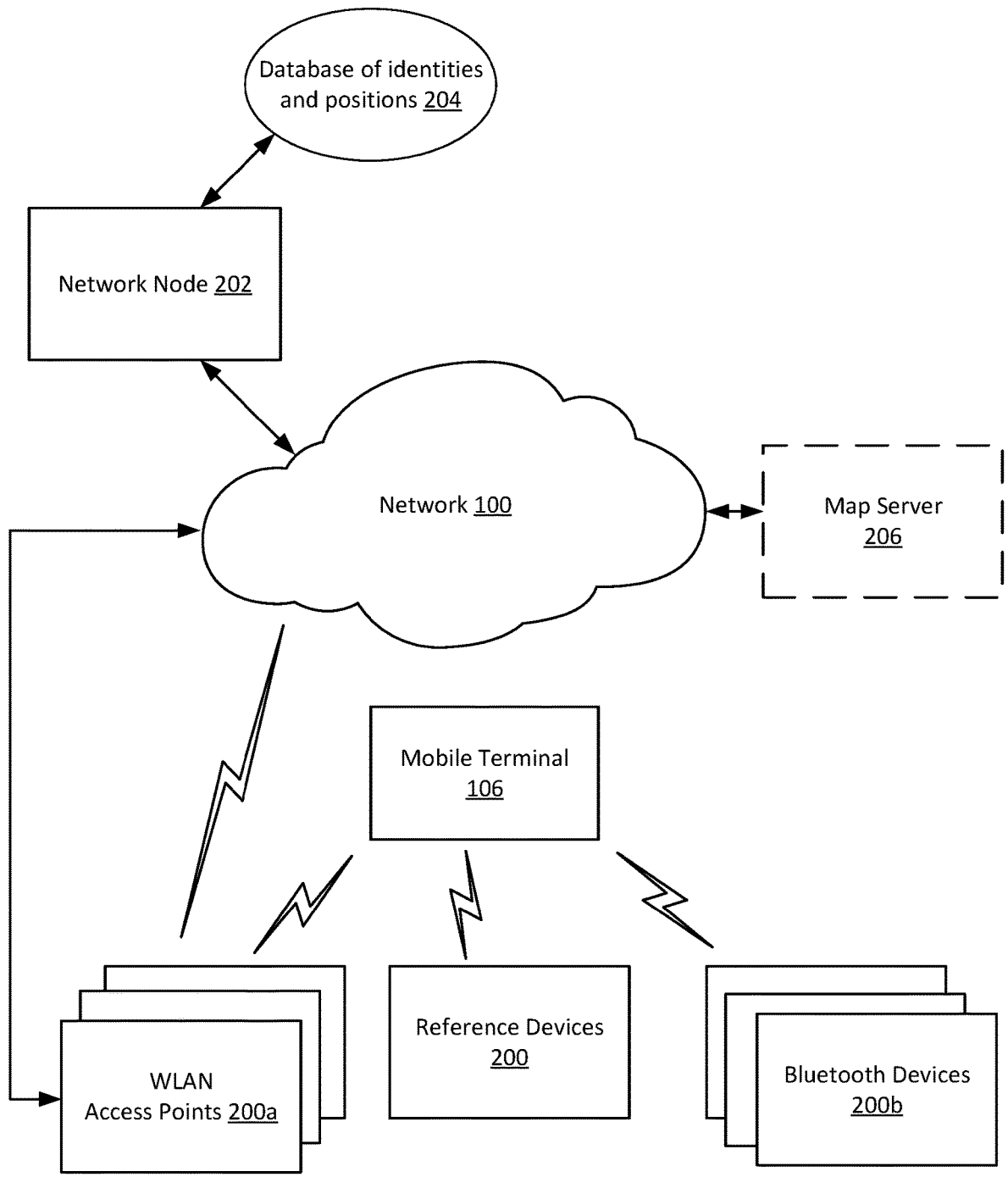
FIG. 2 is a block diagram of a communications network in accordance with some embodiments of the present disclosure.

FIG. 2 is a block diagram of a communications network in accordance with some embodiments of the present disclosure.

Although the subject matter described herein may be implemented in any appropriate type of system using any suitable components, the embodiments disclosed herein are described in relation to a wireless network, such as the example wireless network illustrated in FIG. 2. For simplicity, the wireless network of FIG. 2 only depicts network 100, reference devices 200, which may be WLAN access points 200a or Bluetooth devices 200b, network node 202, mobile terminal 106, a database of identities and positions 204, and a map server 206. In practice, a wireless network may further include any additional elements suitable to support communication between wireless devices or between a wireless device and another communication device, such as any other network node or end device.

Network node 202 may be, but is not limited to, access points (APs) (e.g., radio access points), base stations (BSs) (e.g., radio base stations, Node Bs, evolved Node Bs (eNBs) and NR NodeBs (gNBs)), or network nodes that are located in network 100 or communicatively connected to network 100 (e.g., core network nodes such as a mobile management entity (MME), evolved serving mobile location center (E-SMLC), location management function (LMF), secure user plane location platform (SLP). Network node 202 may be in communication with the database 204 of identities and positions of reference devices. Network node 202 is sometimes referred to herein as positioning network node.

The communication network may include a map server 206 that downloads or pushes map or positioning content, e.g. Google maps or Apple maps, through wired networks (e.g., Ethernet) and/or through wireless access points to mobile terminals 106 or reference devices 200. Map server 206 includes, without limitation, map or positioning content for businesses proximately located to a mobile terminal 106.

With reference to FIG. 2, the mobile terminal 106 uses one or more patterns to choose which information to measure or report to a network node for the network 100. The mobile terminals 106 may obtain the pattern(s) from the network 100 such as, e.g., from a radio access node of RAN 102, a core node of CN 104 (such as a MME, LMF, or SLP), or network node 202. The mobile terminals 106 also may obtain the pattern(s) from default or standardized values.

These and other related operations will now be described in the context of the operational flowcharts of FIGS. 3-6 that are performed by a mobile terminal. Each of the operations described in FIGS. 3-6 can be combined and/or omitted in any combination with each other, and it is contemplated that all such combinations fall within the spirit and scope of this disclosure. For example, some operations of FIG. 3 may be optional or omitted (e.g., operation 302 may be omitted).

Figure 3:
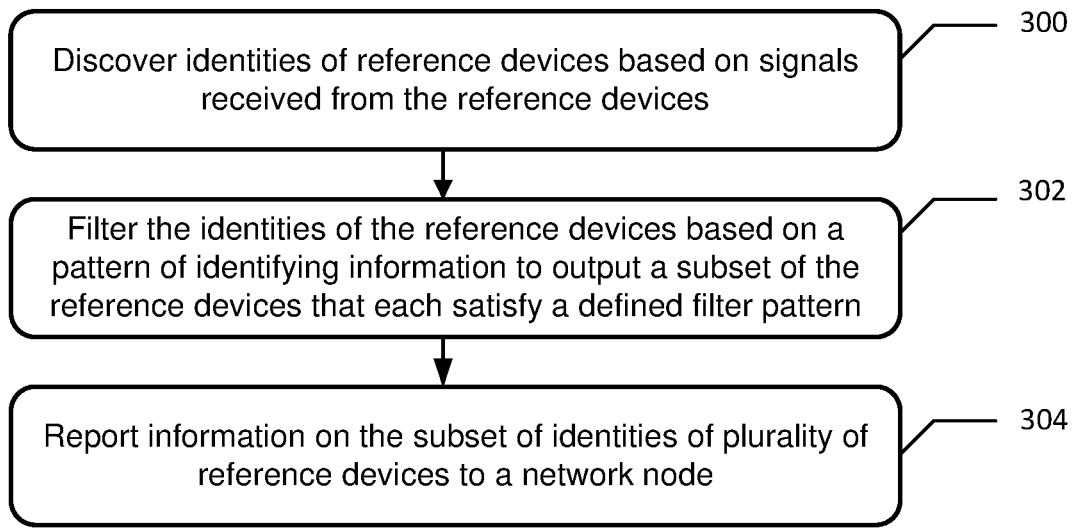
FIGS. 3-6 are flowcharts of operations that are performed by a mobile terminal, in accordance with some embodiments of the present disclosure.

Referring initially to FIG. 3, operations are performed by a mobile terminal (e.g., 106 in in FIG. 7) for reporting a subset of identities of reference devices (e.g., 200, 200a, and 200b in FIG. 2) to a network node (e.g., 202 in FIG. 2) of a communications network.

In some embodiments, operations that are performed by the mobile terminal can include discovering 300 identities of the reference devices (200, 200a, 200b) based on signals received from the reference devices; filtering 302 the discovered identities of the reference devices, e.g. based on a pattern of identifying information, to obtain a subset of identities of the reference devices that each satisfy a defined filter pattern; and reporting 304 information on the subset of the identities of the reference devices to the network node 202, as discussed further below.

In one embodiment, operations that are performed by the mobile terminal to support positioning of the mobile terminal include discovering 300 identities of a plurality of reference devices (200, 200a, 200b) based on signals received from the plurality of reference devices; and reporting 304 information on the subset of the identities of the plurality of reference devices to the network node. The reporting 304 is based on outputting the subset of the identities of the plurality of reference devices, where each one of the identities of the subset satisfy a defined filter pattern. In this embodiment, the mobile terminal may also obtain the defined filter pattern from the network node. In an embodiment of a method performed by a network node, the network node sends the defined filter pattern to a mobile terminal and receives identities of a plurality of reference devices, wherein the received identities are a subset of identities of a plurality of reference devices, which subset has been obtained by the mobile terminal using the defined filter pattern.

Figure 4:
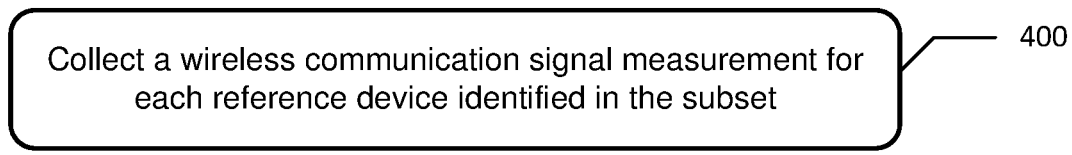

With reference to FIG. 4, further operations that are performed by the mobile terminal include collecting 400 wireless communication signal measurements for each of the reference devices identified in the subset.

In some embodiments, the identities of the reference devices that are discovered include, without limitation, signal strength, identities, device types (e.g. a Bluetooth beacon type device), or a group of devices (e.g., by type, brand (e.g. Apple)), etc., such as a WLAN BSSID, a WLAN SSID, a media access control address, a Bluetooth address, and/or a Bluetooth device name.

The pattern(s) may be a regular expressions ("regex"). Regex is a sequence of characters that represent some form of pattern for matching text. In other words, regex provides a search pattern. Many computer programming languages provide libraries for using regex. For example, a programming language called "Python", uses regex are described, e.g., in https://docs.python.org/3/library/re.html and https://docs.python.org/3/howto/regex.html.

In some embodiments, for positioning based on WLAN, a pattern is a pattern of BSSID and/or SSID. Similarly, for positioning based on Bluetooth, a pattern is a pattern of media access control (MAC) addresses, Bluetooth addresses, and/or Local Names (e.g. Bluetooth device names).

In some embodiments, the pattern is, e.g., "^3GPP meeting." for SSID. For such a pattern, the following SSIDs match the pattern: "3GPP meeting #23" and "3GPP meeting #25", but the following SSIDs do not match the pattern "John Doe phone". In this example, Python regex functionality is included. Caret (A) matches the start of the string, Dot (.) matches any character, and Star (*) matches zero or more repetitions of the preceding character.

In some embodiments, the pattern is, e.g., "^01:01:.*" for BSSID. For such a pattern, the following BSSIDs match the pattern: "01:01:01:01:01:01" and "01:01:01:01:01:02", but the following BSSIDs do not match the pattern "02:02:02:02:02:02".

In some embodiments, the pattern is, e.g., "^03:03:.*" for MAC address. For such a pattern, the following BSSIDs match the pattern "03:03:03:03:03:03", but the following BSSIDs do not match the pattern "04:04:04:04:04:04".

In some embodiments, the pattern is, e.g., "^3GPP Bluetooth.*" for Local Name. For such a pattern, the following BSSIDs match the pattern "3GPP Bluetooth #1", but the following BSSIDs do not match the pattern "John Doe speaker". In a further embodiment, the pattern is, e.g., "112.*" for Local Name. This may enable a Bluetooth device owner/user to indicate that information of the device may be used for emergency call purposes by including the sequence "112" anywhere in Local Name.

In some embodiments, the pattern is static values, e.g., defined by 3GPP, or based on MCC (mobile country code), MNC (mobile network code), realm, or any PLMN (public land mobile network) specific identifiers. An example of MCC is "240". An example of MNC is "16". An example of realm is "ericsson.com". An example of PLMN specific identifier is "Sweden". Static values also may be regex patterns, e.g., *, MCC*. In a further embodiment, the pattern is dynamic values, e.g., provided by the network dynamically to mobile terminals as broadcast information or in other protocol messages like RRC (radio resource control), NAS (non-access stratum), or LPP (LTE positioning protocol). An example of LPP messages in which the pattern may be provided to a mobile terminal is RequestLocationInformation such as WLAN-RequestLocationInformation-r13 and BT-RequestLocationInformation-r13. Examples of RRC messages in which the pattern may be provided are RRC messages related to load balancing measurements, such as MeasObjectWLAN-r13, WLAN-MobilityConfig-r13, WLAN-Id-List-r13 and WLAN-Id-List-r12, and RRC messages related to/as part of minimization of drive test, such as OtherConfig-r9, BT-NameListConfig-r15 and WLAN-NameListConfig-r15.

Although various embodiments are explained herein in the non-limiting context of WLAN and Bluetooth devices, the invention is not so limited. Instead, these and other devices which transmit their identities through via radio frequency (RF) signalling and/or light signalling (e.g., Light WiFi) through a wireless air interface may be used as reference devices.

While embodiments discussed above are explained in the non-limiting context of a regex pattern, the invention is not so limited. Instead, other patterns may be used, including without limitation, the following additional example of patterns.

In some embodiments, the pattern is a bitmap that provides a mapping between some information to bits. An example of a bitmap includes mapping the presence or absence of three fruits to each bit of a 3-bits long bitmap. For example, Apple, Orange, and Banana are mapped to Bit 0, 1, and 2 respectively. Each bit has a value of zero or one. If Bit 0 has value zero, then there is no Apple. If Bit 0 has a value of one, then there is Apple, etc.t. A bitmap [110] would mean that Apple and Orange are present, but Banana is not.

In some embodiments, a pattern is a bitmap to include/exclude WLAN AP per band, e.g. 2.4 GHz indicator or 5 GHz indicator. For example [1,0] will only include 2.4 GHz WLAN. In a further embodiment, a pattern is a bitmap that spans channel numbers, e.g., WLAN 2.4 GHz uses channel numbers [n1, . . . n14], so for example [10000100001000] will only include APs at channels 1,6,11. In a further embodiment, a pattern is a bitmap that indicates BLE beacon types, such as iBeacon, Eddystone, etc. which may be provided as a data part of an advertisement message from the BLE device, and the type is identified from the data header.

Referring again to FIG. 3, in some embodiments, operations that are performed by the mobile terminal include filtering 302 the identities of the reference devices based on a pattern, e.g. any of the patterns of identifying information in the identity of a reference device discussed above, to output a subset of the identities of the reference devices that each satisfy a defined filter pattern, e.g., any of the matches discussed above.

In some embodiments, the filtering 302 of the identities of the reference devices outputs identities for inclusion in the subset that are determined to match a string of characters defined by the defined filter pattern.

In some embodiments, the filtering 302 of the identities of the reference devices outputs identities for inclusion in the subset that are determined to match at least one of a default value defined by the defined filter pattern, a mobile country code defined by the defined filter pattern, a mobile network code defined by the defined filter pattern, a realm defined by the defined filter pattern, and a public land mobile network identifier defined by the defined filter pattern.

In some embodiments, positioning is based on WLAN. For positioning modes requiring a mobile terminal to send WLAN measurements to the network (e.g., mobile terminal-assisted), the positioning network node or another network node provides the defined pattern of WLAN supervision data to mobile terminals. The defined pattern of WLAN supervision data includes a list of WLAN APs' information that may be measured by mobile terminals. Each WLAN AP information may contain a basic service set identifier (BSSID) information and/or a service set identifier (SSID) information.

If the mobile terminals get the defined pattern of WLAN supervision data from the network, the mobile terminals may send to the network the WLAN measurements whose BSSIDs and/or SSIDs from the filtering 302 match the BSSIDs and/or SSIDS in the provided defined pattern of WLAN supervision data.

If the mobile terminals do not get the defined pattern of WLAN supervision data from the network, the mobile terminals may send to the network the WLAN measurements whose BSSIDs and/or SSIDs from the filtering 302 match the BSSIDs and/or SSIDS in a defined pattern of reference WLAN supervision data. The defined pattern of reference WLAN supervision data may include reference BSSID information and reference SSID information.

In some embodiments, the WLAN measurements that the mobile terminal sends to the network include, but are not limited to, a received signal strength, a time stamp of the time when the measurements were performed by the mobile terminal, a reference device position estimate, and/or a position time stamp.

The defined filter pattern of BSSID/SSID information and the pattern of identifying information for reference device BSSID/SSID information may be static values, e.g., defined by 3GPP, or based on MCC, MNC, realm, or any PLMN specific identifiers. The patterns also may not be exact values, e.g., *, MCC*. The patterns may be dynamic values, e.g., provided by the network dynamically to mobile terminals as broadcast information or in other protocol messages like RRC, NAS, or LPP. Further, the pattern of reference WLAN supervision data may be static or dynamic.

In some embodiments, the network controls the collection of WLAN measurements from mobile terminals and mobile terminals do not collect unintended WLAN measurements around the mobile terminals, helping to protect the privacy of neighboring reference devices.

In a further embodiment, positioning is based on Bluetooth. For positioning modes requiring a mobile terminal to send Bluetooth measurements to the network (e.g., mobile terminal-assisted), the network node 202 provides a defined pattern of Bluetooth supervision data to mobile terminals. The defined pattern of Bluetooth supervision data includes a list of Bluetooth APs' information that may be measured by mobile terminals. Each Bluetooth AP information may contain Bluetooth address, Bluetooth public-address and/or Bluetooth device-name information.

If the mobile terminals get the defined pattern of Bluetooth supervision data from the network, the mobile terminals may send to the network the Bluetooth measurements whose Bluetooth addresses, Bluetooth public-addresses and/or Bluetooth device-names from the filtering 302 match the Bluetooth addresses, Bluetooth public-addresses and/or Bluetooth device-names in the provided defined pattern of Bluetooth supervision data.

If the mobile terminals do not get the pattern of Bluetooth supervision data from the network, the mobile terminals may send to the network the Bluetooth measurements whose Bluetooth addresses, Bluetooth public-addresses and/or Bluetooth device-names from the filtering 302 match the Bluetooth addresses, Bluetooth public-addresses and/or Bluetooth device-names in a defined pattern of reference Bluetooth supervision data. The defined pattern of reference Bluetooth supervision data may include reference Bluetooth address information, reference Bluetooth public-address information, and reference Bluetooth device-name information.

In some embodiments, the Bluetooth measurements that the mobile terminal sends to the network include, but are not limited to, a received signal strength, a time stamp of the time when the measurements were performed by the mobile terminal, a reference device position estimate, and/or a position time stamp.

The pattern of Bluetooth address/public-address/device-name information may be static values, e.g., defined by 3GPP, or based on MCC, MNC, realm, or any PLMN specific identifiers. The patterns also may not be exact values, e.g., *, MCC*. The patterns may be dynamic values, e.g., provided by the network dynamically to mobile terminals as broadcast information or in other protocol messages like RRC, NAS, or LPP. Further, the pattern of reference Bluetooth supervision data may be static or dynamic.

Figure 5:
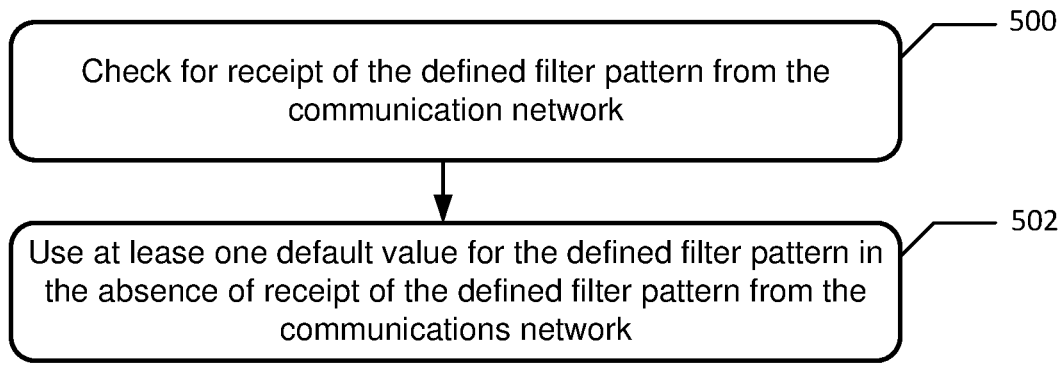

Referring to FIG. 5, in some embodiments, further operations that are performed by the mobile terminal include checking 500 for receipt of the defined filter pattern from the communications network. Responsive to the absence of receipt of the defined filter pattern from the communications network, using 502 at least one default value for the defined filter pattern.

Figure 6:
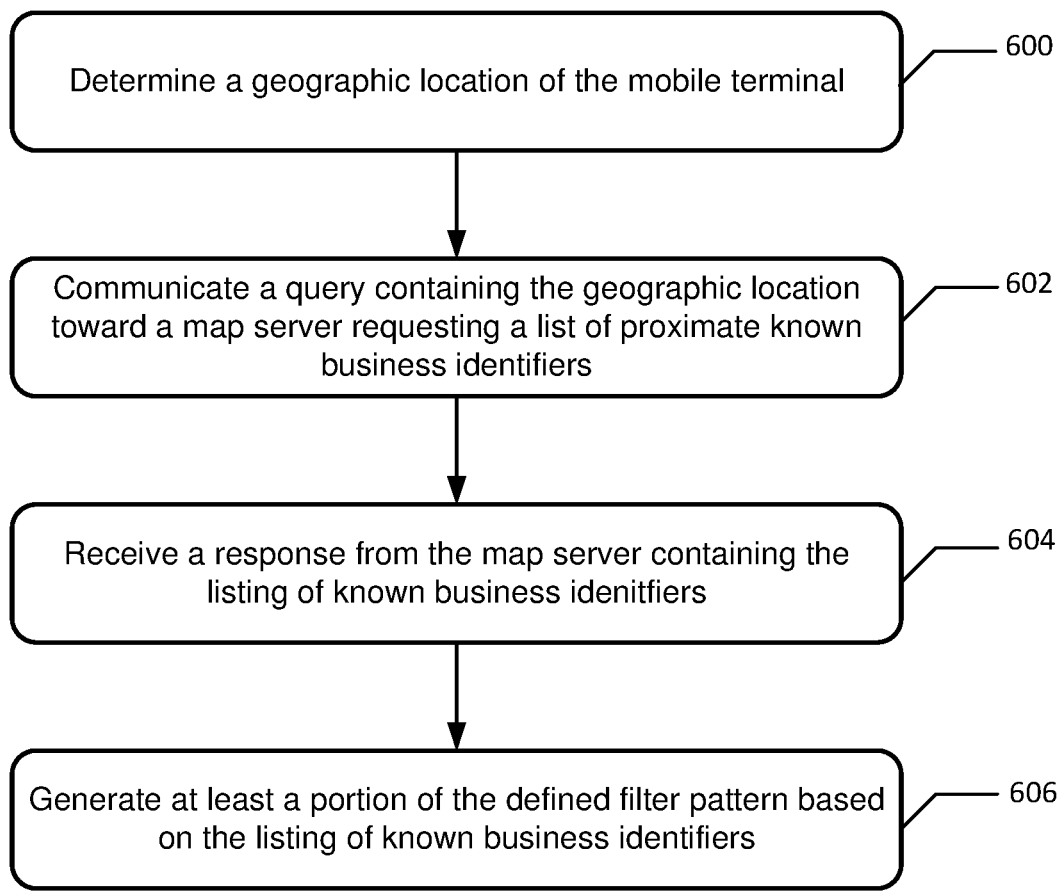

Referring to FIG. 6, in some embodiments, further operations that are performed by the mobile terminal include determining 600 a geographic location of the mobile terminal. Communicating 602 a query containing the geographic location through the communications network toward a map server 206 requesting a listing of known business identifiers proximately located to the mobile terminal 106. Receiving 604 a response from the map server 206 containing the listing of known business identifiers, and generating 606 at least a portion of the defined filter pattern based on the listing of known business identifiers. Business identifiers for a business include, for example, a business name, a location of the business, a geographic position of a business, an address of a business, etc. A geographic location includes, for example, geographic coordinates, a descriptive location or name, a physical postal or visiting address, etc.

Referring to FIGS. 3 and 6, in some embodiments, the filtering 302 of the identities of the reference devices outputs identities for inclusion in the subset that are determined to contain at least a defined portion of one of the listings of known business identifiers.

In some embodiments, the network controls the collection of Bluetooth measurements from mobile terminals and mobile terminals do not collect unintended Bluetooth measurements around the mobile terminals, helping to protect the privacy of neighboring reference devices.

Example Terminal and Network Node

Figure 7:
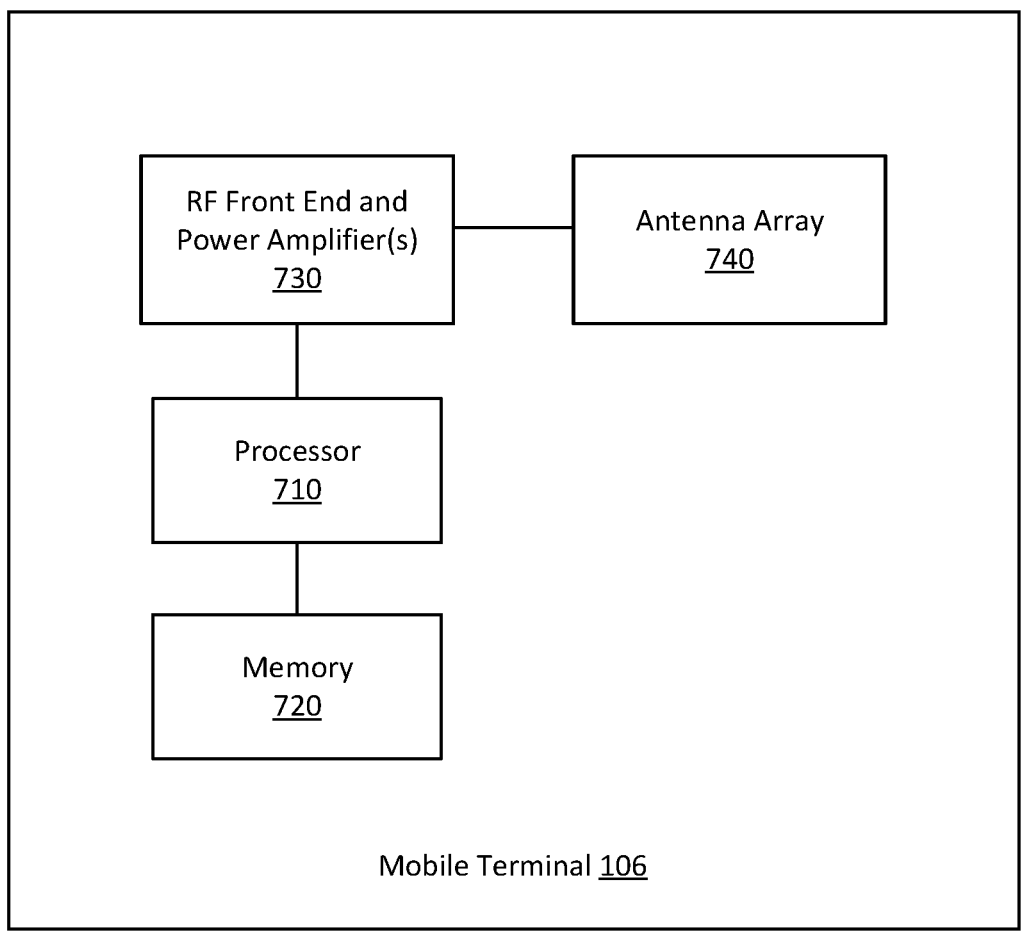
FIG. 7 is a block diagram of elements of a mobile terminal that are configured according to some embodiments of the present disclosure.

FIG. 7 is a block diagram illustrating a mobile terminal 106 that is configured according to some embodiments. The mobile terminal 106 can include, without limitation, a wireless terminal, a wireless communication device, a wireless communication terminal, a terminal node/UE/device, etc. The mobile terminal 106 includes a RF front-end 730 comprising one or more power amplifiers the transmit and receive through antennas of an antenna array 740 to provide uplink and downlink radio communications with a radio network node (e.g., a base station, eNB, gNB, etc.) of a telecommunications network. Instead of or in addition to the RF front-end 730, the mobile terminal 106 may include a light reception front-end configured to receive light signaling such from a Light WiFi AP. Mobile terminal 106 further includes a processor circuit 710 (also referred to as a processor) coupled to the RF front end 730 and a memory circuit 720 (also referred to as memory). The memory 720 stores computer readable program code that when executed by the processor 710 causes the processor 710 to perform operations according to embodiments disclosed herein.

Figure 8:
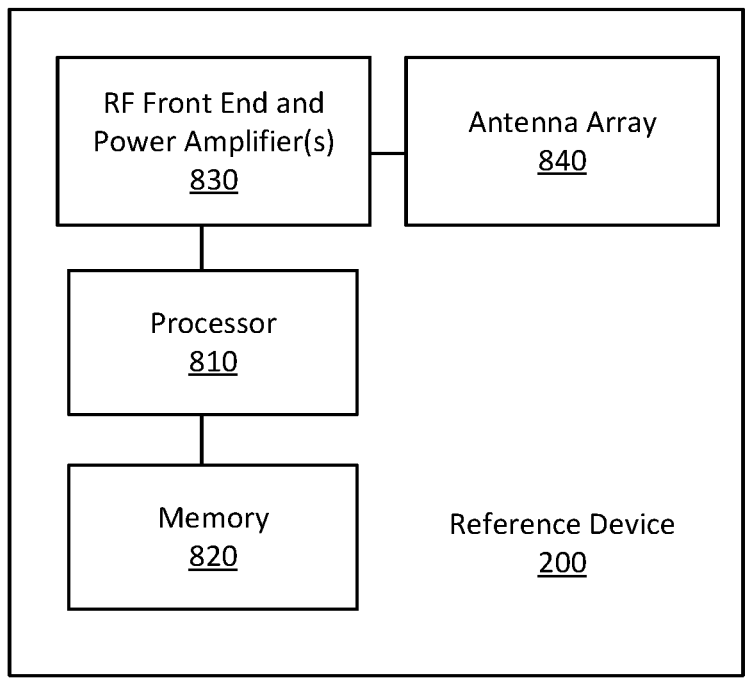
FIG. 8 is a block diagram of elements of a reference device that are configured according to some embodiments of the present disclosure.

FIG. 8 is a block diagram illustrating a reference device 200 that is configured according to some embodiments. The reference device 200 can include, without limitation, a WLAN access point, Bluetooth, a mobile terminal acting as an access point, TBS, or other beacons etc. The reference device 200 includes a RF front-end 830 comprising one or more power amplifiers the transmit and receive through antennas of an antenna array 840 to provide uplink and downlink radio communications with a radio network node (e.g., a base station, eNB, gNB, etc.) of a telecommunications network. Instead of or in addition to the RF front-end 830, the reference device 200 may include a light transmission front-end configured to transmit light signaling such as when functioning as a Light WiFi AP. Reference device 200 further includes a processor circuit 810 (also referred to as a processor) coupled to the RF front end 830 and a memory circuit 820 (also referred to as memory). The memory 820 stores computer readable program code that when executed by the processor 810 causes the processor 810 to perform operations according to embodiments disclosed herein.

Figure 9:
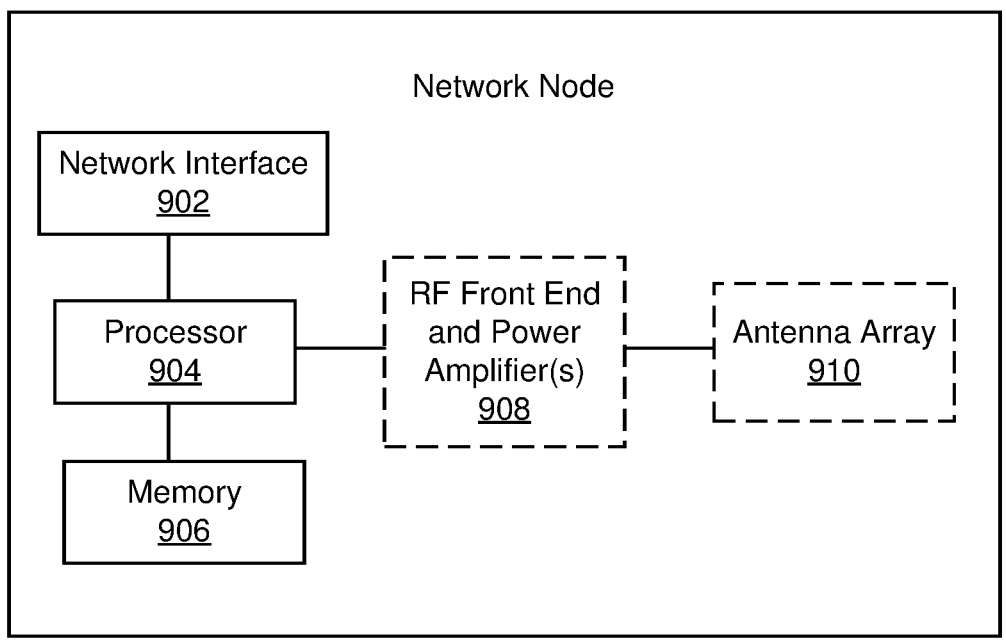
FIG. 9 is a block diagram of elements of a network node that are configured according to some embodiments of the present disclosure.

FIG. 9 is a block diagram illustrating a network node 900 (e.g., a base station, eNB, gNB, etc.) of a telecommunications network. The network node 900 includes a processor circuit 904 (also referred to as a processor), a memory circuit 906 (also referred to as memory), and a network interface 902 (e.g., wired network interface and/or wireless network interface) configured to communicate with other network nodes. The network node 900 may be configured as a radio network node containing a RF front-end and/or a light signaling front-end with one or more power amplifiers 908 that transmit and receive through antennas of an antenna array 910. The memory 906 stores computer readable program code that when executed by the processor 904 causes the processor 904 to perform operations according to embodiments disclosed herein.

Example Embodiments are discussed below. Reference numbers/letters are provided in parenthesis by way of example/illustration without limiting example embodiments to particular elements indicated by reference numbers/letters.

Embodiment 1

A method of operating a mobile terminal 106 for reporting wireless communication signal measurements for a plurality of reference devices 200, 200a, 200b to a network node 202 in a communications network. The method includes discovering 300 identities of the plurality of reference devices based on signals received from the plurality of reference devices. The method further includes filtering 302 the identities of the plurality of reference devices based on a pattern of identifying information to output a subset of identities of the plurality of reference devices that each satisfy a defined filter pattern. The method further includes reporting 304 information on the subset of the identities of the plurality of reference devices to the network node.

Embodiment 2

The method of Embodiment 1, further including collecting 400 wireless communication signal measurements for each of the reference devices identified in the subset.

Embodiment 3

The method of any of Embodiments 1 to 2, wherein the identities of the plurality of reference devices that are discovered include at least one of: a WLAN basic service set identifier, a WLAN service set identifier, a media access control address, a Bluetooth address, and a Bluetooth device name.

Embodiment 4

The method of any of Embodiments 1 to 3, wherein the filtering 302 of the identities of the plurality of reference devices outputs identities for inclusion in the subset that are determined to match a string of characters defined by the defined filter pattern.

Embodiment 5

The method of any of Embodiments 1 to 4, wherein the filtering 302 of the identities of the plurality of reference devices outputs identities for inclusion in the subset that are determined to match at least one of: a default value defined by the defined filter pattern, a mobile country code defined by the defined filter pattern, a mobile network code defined by the defined filter pattern, a realm defined by the defined filter pattern, and a public land mobile network identifier defined by the defined filter pattern.

Embodiment 6

The method of any of Embodiments 1 to 5, further including receiving the defined filter pattern from the network node 202 or another node of the communications network.

Embodiment 7

The method of any of Embodiments 1 to 6, further including checking 500 for receipt of the defined filter pattern from the communications network. The method further including responsive to an absence of receipt of the defined filter pattern from the communications network, using 502 at least one default value for the defined filter pattern.

Embodiment 8

The method of any of Embodiments 1 to 7, wherein the wireless communication signal measurements include at least one or more of: a received signal strength, a time stamp, a reference device position estimate, and a position time stamp.

Embodiment 9

The method of any of Embodiments 1 to 8, further including determining 600 a geographic location of the mobile terminal. The method further including communicating 602 a query containing the geographic location through the communications network toward a map server requesting a listing of known business identifiers proximately located to the mobile terminal. The method further including receiving 604 a response from the map server containing the listing of known business identifiers. The method further including generating 606 at least a portion of the defined filter pattern based on the listing of known business identifiers.

Embodiment 10

The method of any of Embodiments 1 to 9, wherein the filtering 302 of the identities of the plurality of reference devices outputs identities for inclusion in the subset that are determined to contain at least a defined portion of one of the listing of known business identifiers.

Embodiment 11

A mobile terminal 106 includes at least one processor 710 and at least one memory 720 connected to the at least one processor 710. The memory stores program code that is executed by the at least one processor 710 to perform operations including discovering 300 identities of the plurality of reference devices based on signals received from the plurality of reference devices. The operations further include filtering 302 the identities of the plurality of reference devices based on a pattern of identifying information to output a subset of identities of the plurality of reference devices that each satisfy a defined filter pattern. The operations further include reporting 304 information on the subset of the identities of the plurality of reference devices to the network node.

Embodiment 12

The mobile terminal of Embodiment 11, further including collecting 400 wireless communication signal measurements for each of the reference devices identified in the subset.

Embodiment 13

The mobile terminal of any of Embodiments 11-12, wherein the identities of the plurality of reference devices that are discovered include at least one of: a WLAN basic service set identifier, a WLAN service set identifier, a media access control address, a Bluetooth address, and a Bluetooth device name.

Embodiment 14

The mobile terminal of any of Embodiments 11 to 13, wherein the filtering 302 of the identities of the plurality of reference devices outputs identities for inclusion in the subset that are determined to match a string of characters defined by the defined filter pattern.

Embodiment 15

The mobile terminal of any of Embodiments 11 to 14, wherein the filtering 302 of the identities of the plurality of reference devices outputs identities for inclusion in the subset that are determined to match at least one of: a default value defined by the defined filter pattern, a mobile country code defined by the defined filter pattern, a mobile network code defined by the defined filter pattern, a realm defined by the defined filter pattern, and a public land mobile network identifier defined by the defined filter pattern.

Embodiment 16

The mobile terminal of any of Embodiments 11 to 15, wherein the memory 720 further stores program code that is executed by the at least one processor 710 to perform further operations including receiving the defined filter pattern from the network node 202 or another node of the communications network.

Embodiment 17

The mobile terminal of any of Embodiments 11 to 16, wherein the memory 720 further stores program code that is executed by the at least one processor 710 to perform further operations including checking 500 for receipt of the defined filter pattern from the communications network. The operations further include responsive to an absence of receipt of the defined filter pattern from the communications network, using 502 at least one default value for the defined filter pattern.

Embodiment 18

The mobile terminal of any of Embodiments 11 to 17, wherein the wireless communication signal measurements comprise at least one or more of: a received signal strength, a time stamp, a reference device position estimate, and a position time stamp.

Embodiment 19

The mobile terminal of any of Embodiments 11 to 18, wherein the memory 710 further stores program code that is executed by the at least one processor to perform further operations further including determining 600 a geographic location of the mobile terminal. The operations further include communicating 602 a query containing the geographic location through the communications network toward a map server requesting a listing of known business identifiers proximately located to the mobile terminal. The operations further include receiving 604 a response from the map server containing the listing of known business identifiers. The operations further include generating 606 at least a portion of the defined filter pattern based on the listing of known business identifiers.

Embodiment 20

The mobile terminal of any of Embodiments 11 to 19, wherein the filtering 302 of the identities of the plurality of reference devices outputs identities for inclusion in the subset that are determined to contain at least a defined portion of one of the listing of known business identifiers.

Embodiment 21

A computer program product including a non-transitory computer readable medium 720 storing program code configured for execution by a processor 710 of a mobile terminal 106 to cause the processor 710 to perform operations for reporting wireless communication signal measurements for a plurality of reference devices 200, 200a, 200b to a network node 202 in a communications network. The operations include discovering 300 plurality of reference devices based on signals received from the plurality of reference devices. The operations further include filtering 302 the identities of the plurality of reference devices based on a pattern of identifying information to output a subset of identities of the plurality of reference devices that each satisfy a defined filter pattern. The operations further include reporting 304 information on the subset of the identities of the plurality of reference devices to the network node.

Embodiment 22

The computer program product of Embodiment 21, the operations further including collecting 400 wireless communication signal measurements for each of the reference devices 200, 200a, 200b identified in the subset.

Embodiment 23

The computer program product of any of Embodiments 21 to 22, wherein the identities of the plurality of reference devices that are discovered include at least one or more of: a WLAN basic service set identifier, a WLAN service set identifier, a media access control address, a Bluetooth address, and a Bluetooth device name.

Embodiment 24

The computer program product of any of Embodiments 21 to 23, wherein the filtering of the identities of the plurality of reference devices outputs identities for inclusion in the subset that are determined to match a string of characters defined by the defined filter pattern.

Embodiment 25

The computer program product of any of Embodiments 21 to 24, wherein the filtering 302 of the identities of the plurality of reference devices outputs identities for inclusion in the subset that are determined to match at least one of: a default value defined by the defined filter pattern, a mobile country code defined by the defined filter pattern, a mobile network code defined by the defined filter pattern, a realm defined by the defined filter pattern, and a public land mobile network identifier defined by the defined filter pattern.

Embodiment 26

The computer program product of any of Embodiments 21 to 25, the operations including receiving the defined filter pattern from the network node 202 or another node of the communications network.

Embodiment 27

The computer program product of any of Embodiments 21 to 26, the operations further including checking 500 for receipt of the defined filter pattern from the communications network. The operations further include responsive to an absence of receipt of the defined filter pattern from the communications network, using 502 at least one default value for the defined filter pattern.

Embodiment 28

The computer program product of any of Embodiments 21 to 27, wherein the wireless communication signal measurements comprise at least one or more of: a received signal strength, a time stamp, a reference device position estimate, and a position time stamp.

Embodiment 29

The computer program product of any of Embodiments 21 to 28. The operations further include determining 600 a geographic location of the mobile terminal. The operations further include communicating 602 a query containing an area associated with the geographic location through the communications network toward a map server requesting a listing of known business identifiers proximately located to the mobile terminal. The operation further include receiving 604 a response from the map server containing the listing of known business identifiers. The operations further include generating 606 at least a portion of the defined filter pattern based on the listing of known business identifiers.

Embodiment 30

The computer program product of any of Embodiments 21 to 29, wherein the filtering 302 of the identities of the plurality of reference devices outputs identities for inclusion in the subset that are determined to contain at least a defined portion of one of the listing of known business identifiers.

Further Definitions and Embodiments are Discussed Below

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 10:
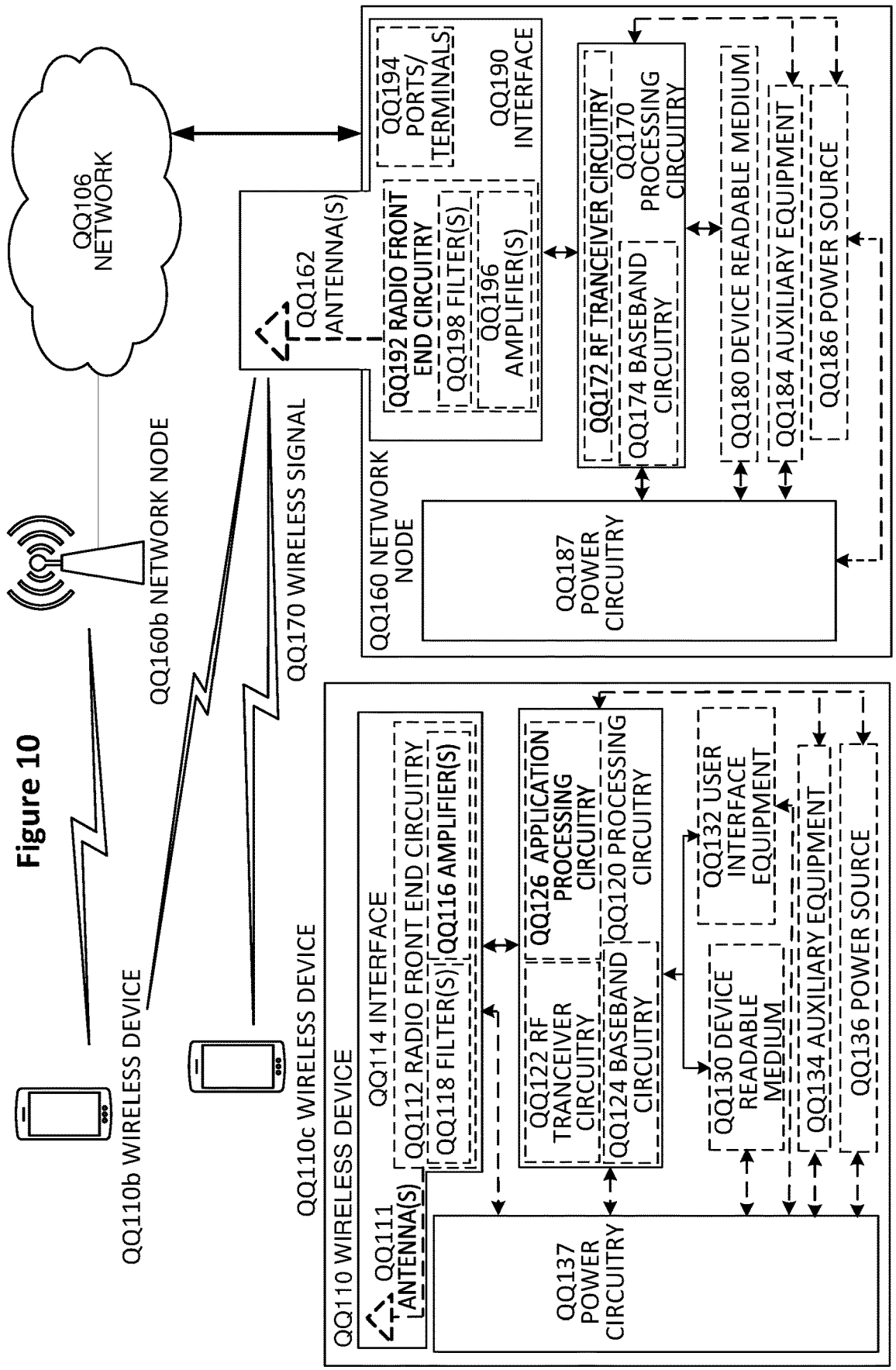
FIG. 10 is a block diagram of a wireless network in accordance with some embodiments of the present disclosure.

FIG. 10: A wireless network in accordance with some embodiments.

Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network QQ106, network nodes QQ160 and QQ160b, and WDs QQ110, QQ110b, and QQ110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units.

In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 10 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE) and other types of a mobile terminal. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V21), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE or other terminal implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated. User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 11:
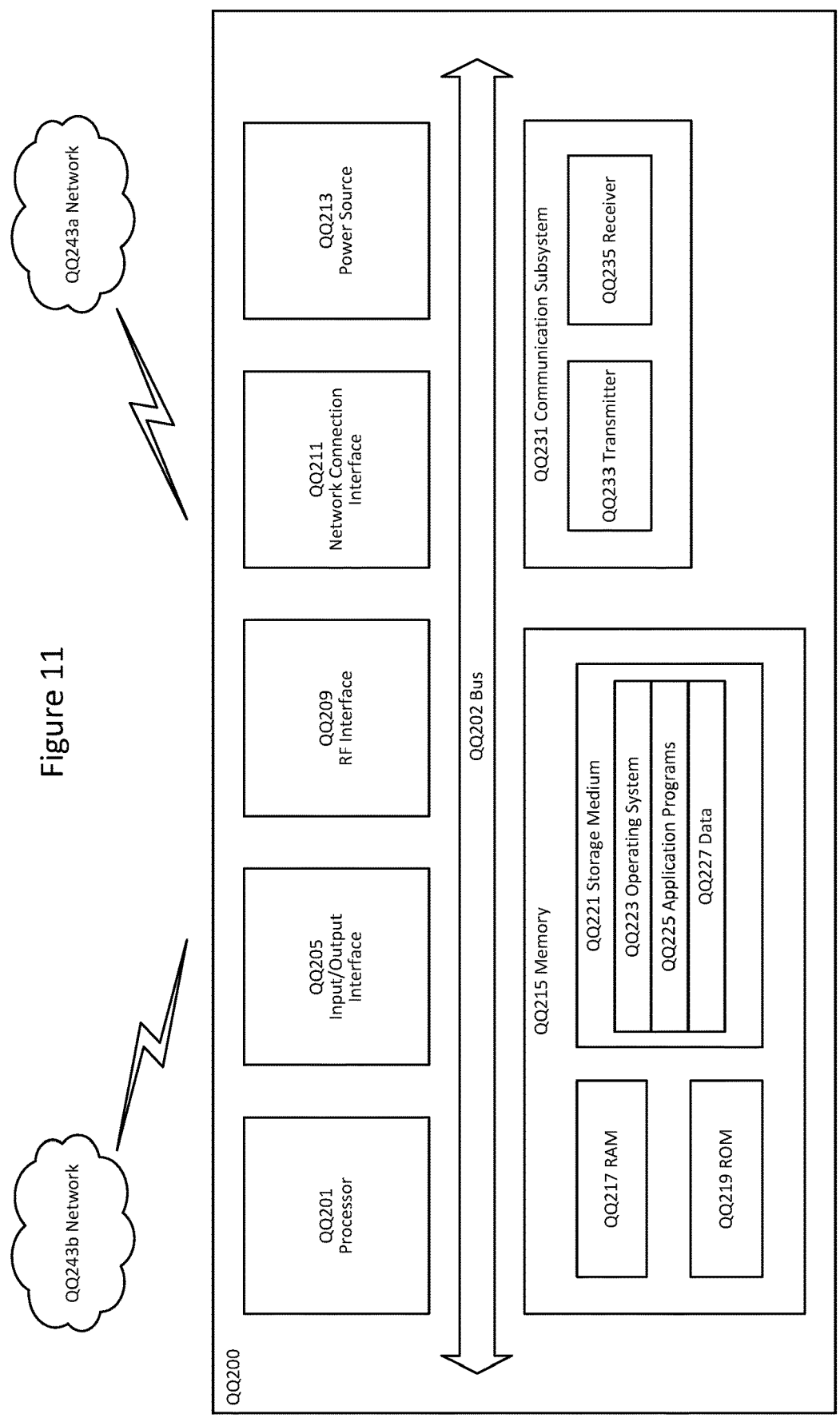
FIG. 11 is a block diagram of a user equipment or other terminal in accordance with some embodiments of the present disclosure.

FIG. 11: User Equipment in accordance with some embodiments

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 11, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 11, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 12:
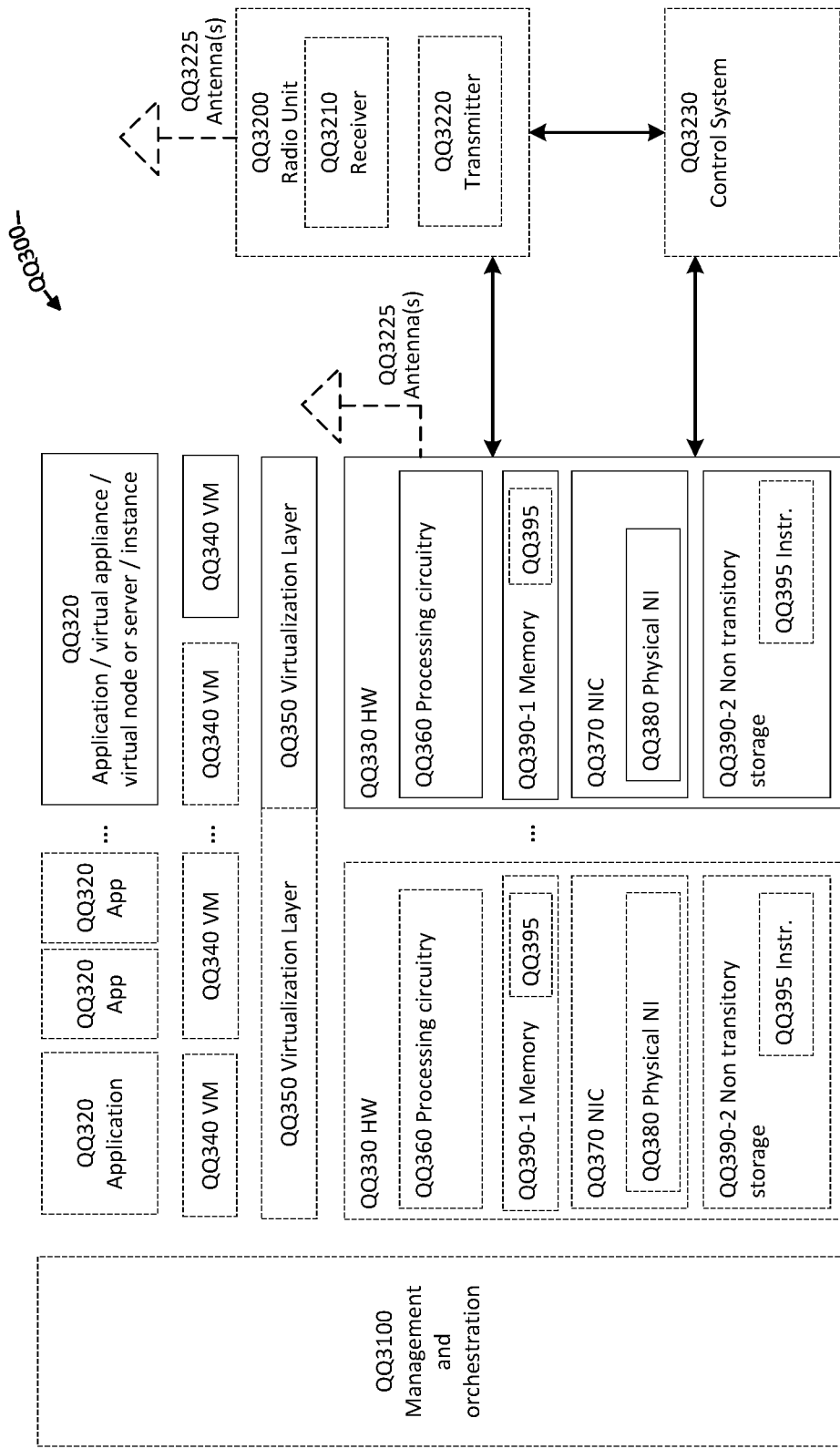
FIG. 12 is a block diagram of a virtualization environment in accordance with some embodiments of the present disclosure.

FIG. 12: Virtualization environment in accordance with some embodiments

FIG. 12 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 12, hardware QQ330 may be a stand-alone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 12.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 13:
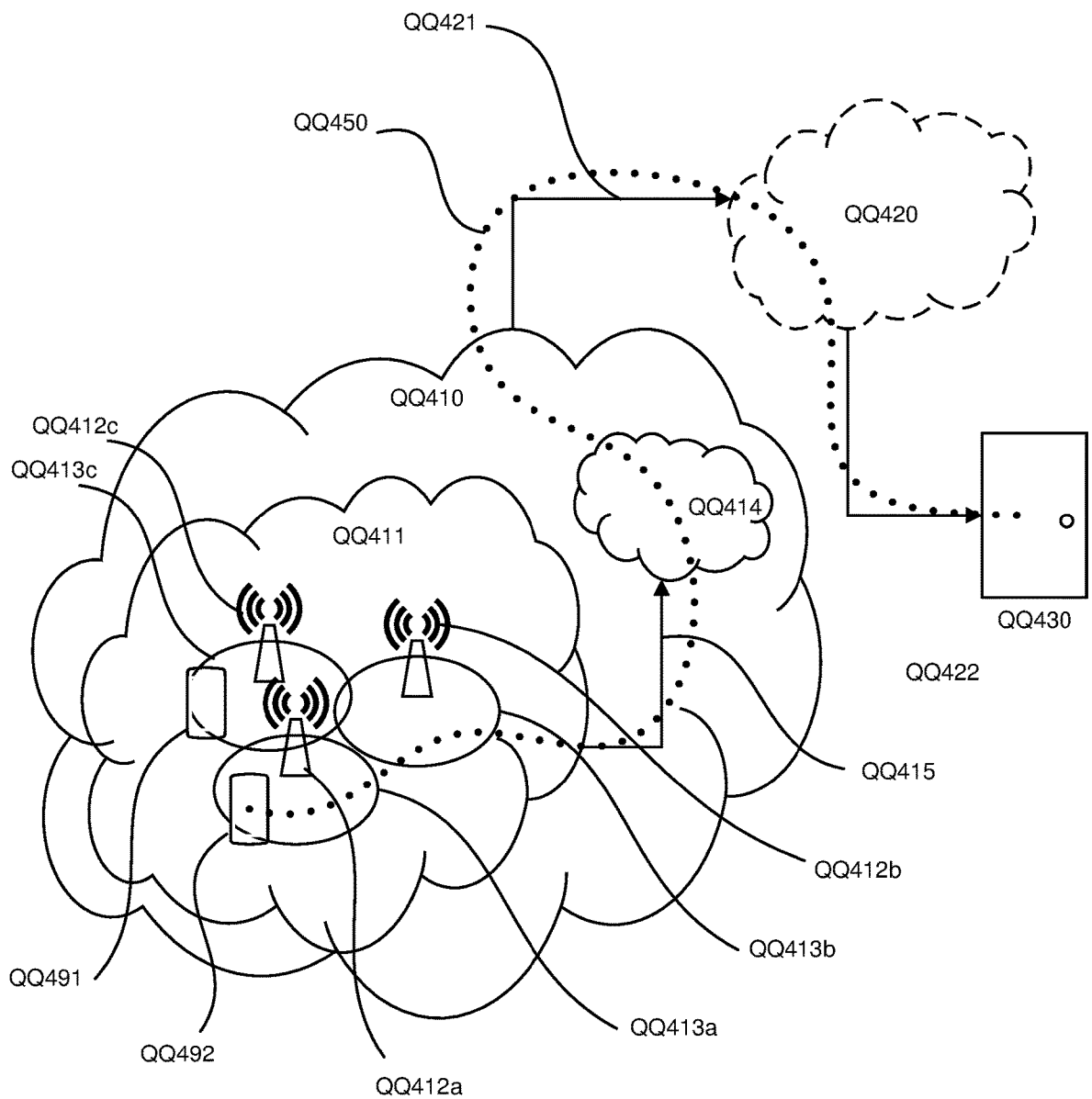
FIG. 13 is a block diagram of a telecommunication network connected via an intermediate network to a host computer in accordance with some embodiments of the present disclosure.

FIG. 13: Telecommunication network connected via an intermediate network to a host computer in accordance with some embodiments.

With reference to FIG. 13, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 13 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 14:
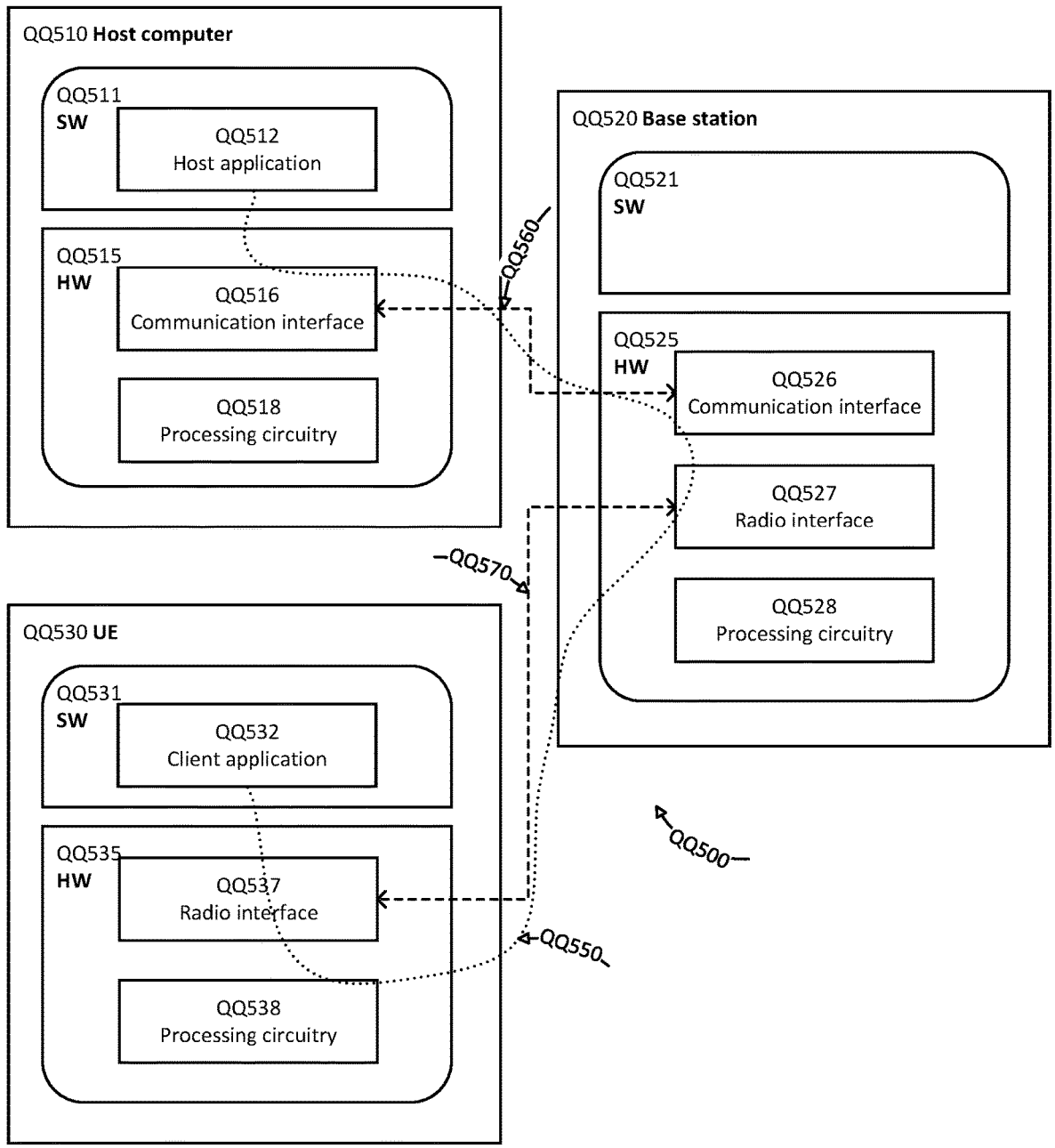
FIG. 14 is a block diagram of a host computer communicating via a base station with a user equipment user equipment or other terminal over a partially wireless connection in accordance with some embodiments of the present disclosure.

FIG. 14: Host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 14. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 14) served by base station QQ520. Communication interface QQ526 may be configured to facilitate connection QQ560 to host computer QQ510. Connection QQ560 may be direct or it may pass through a core network (not shown in FIG. 14) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 14 may be similar or identical to host computer QQ430, one of base stations QQ412a, QQ412b, QQ412c and one of UEs QQ491, QQ492 of FIG. 13, respectively. This is to say, the inner workings of these entities may be as shown in FIG. 14 and independently, the surrounding network topology may be that of FIG. 13.

In FIG. 14, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments may improve the performance of OTT services provided to UE QQ530 using OTT connection QQ550, in which wireless connection QQ570 forms the last segment. More precisely, the teachings of these embodiments may improve the deblock filtering for video processing and thereby provide benefits such as improved video encoding and/or decoding.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 15:
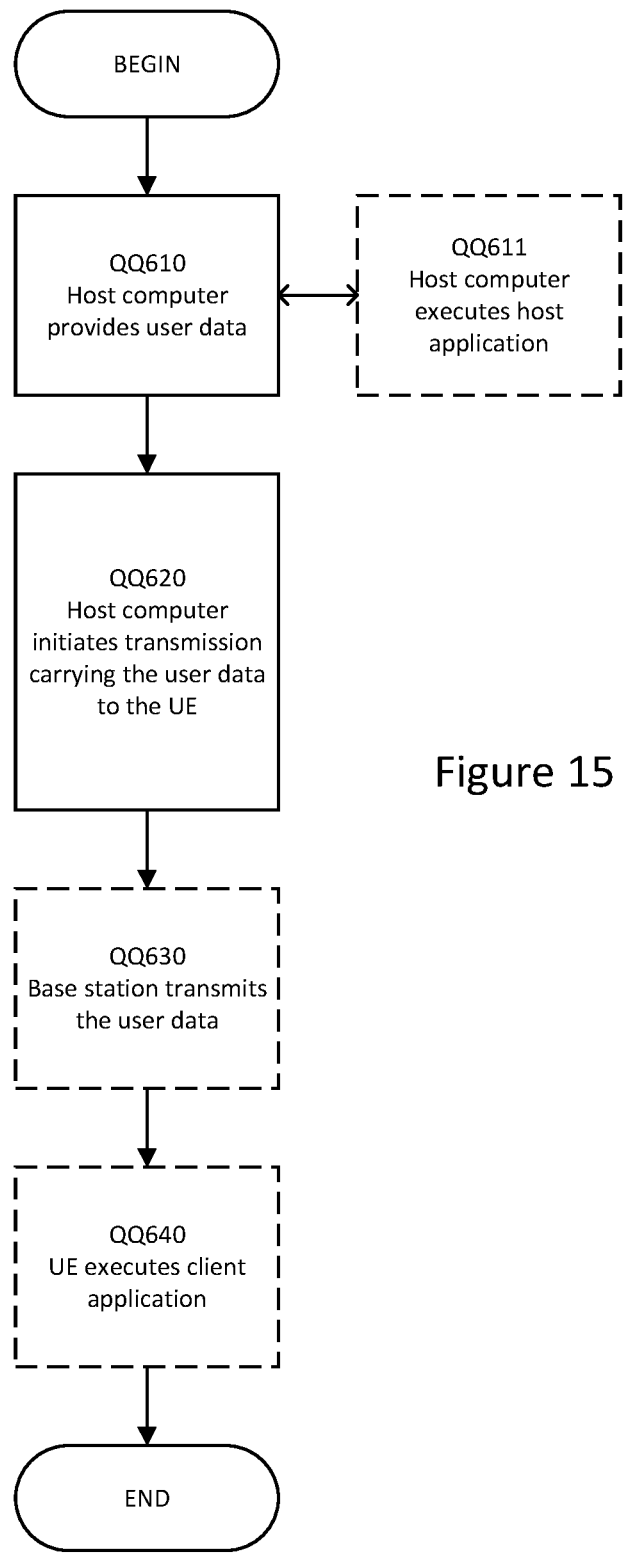
FIG. 15 is a block diagram of methods implemented in a communication system including a host computer, a base station and a user equipment user equipment or other terminal in accordance with some embodiments of the present disclosure.

FIG. 15: Methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 16:
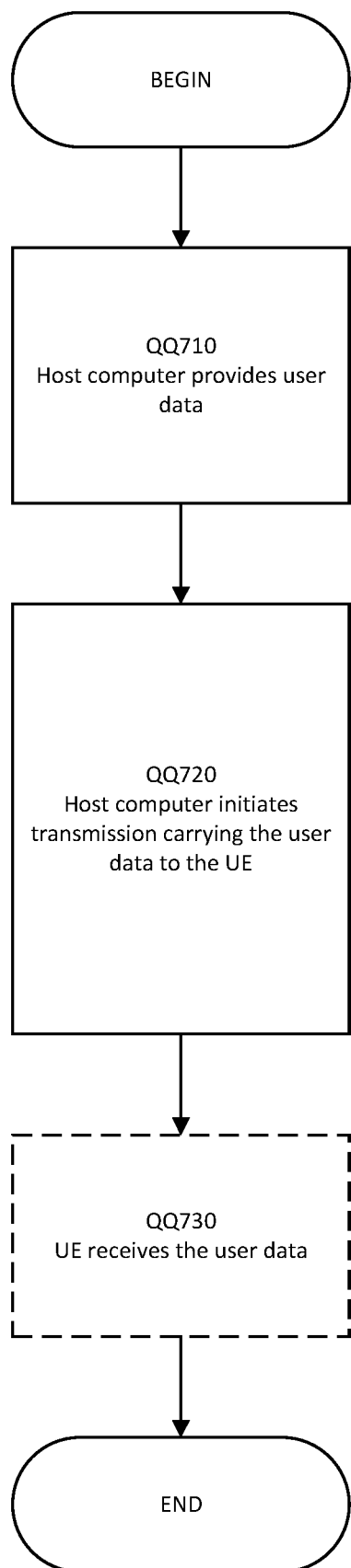
FIG. 16 is a block diagram of methods implemented in a communication system including a host computer, a base station and a user equipment user equipment or other terminal in accordance with some embodiments of the present disclosure.

FIG. 16: Methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 17:
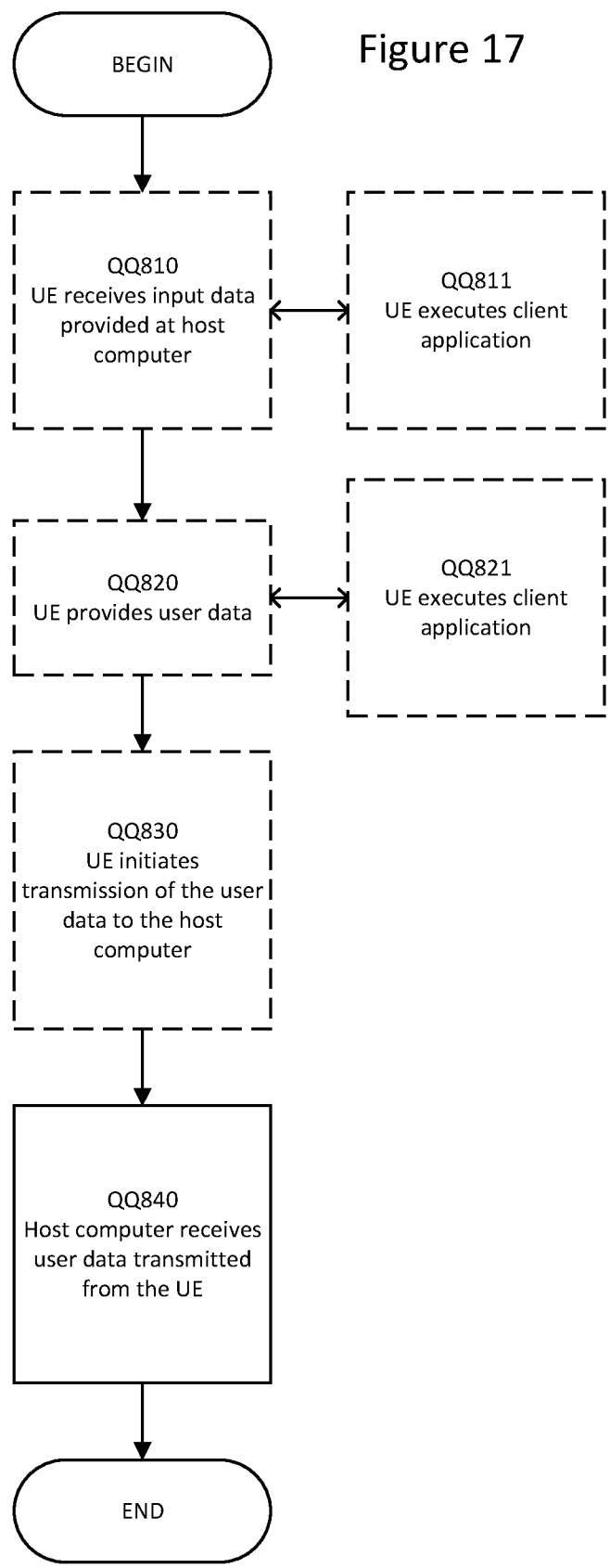
FIG. 17 is a block diagram of methods implemented in a communication system including a host computer, a base station and a user equipment user equipment or other terminal in accordance with some embodiments of the present disclosure.

FIG. 17: Methods implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 18:
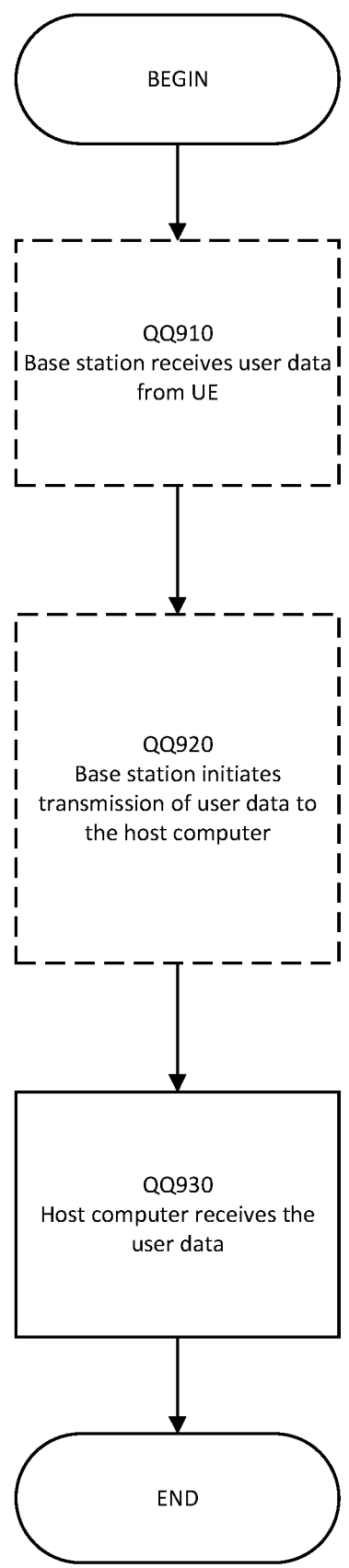
FIG. 18 is a block diagram of methods implemented in a communication system including a host computer, a base station and a user equipment user equipment or other terminal in accordance with some embodiments of the present disclosure.

FIG. 18: Methods implemented in a communication system including a host computer, a base station and a user equipment in accordance with some embodiments.

FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method of operating a mobile terminal for supporting positioning of the mobile terminal:
   receiving a defined filter pattern from a network node in a communications network or another node of the communications network;
   discovering identities of a plurality of reference devices based on signals received from the plurality of reference devices;
   filtering the discovered identities of the plurality of reference devices to obtain a subset of identities of the plurality of reference devices that each satisfy the defined filter pattern; and
   reporting information on the subset of the identities of the plurality of reference devices to the network node.

2. The method of claim 1, wherein the discovering identities of the plurality of reference devices based on signals received from the plurality of reference devices comprises discovering the identity of each of the plurality of reference devices based on a signal received from each of the plurality of reference devices.

3. The method of claim 1, wherein the identities of the plurality of reference devices that are discovered comprise at least one of: a WLAN basic service set identifier, a WLAN service set identifier, a media access control address, a Bluetooth address, and a Bluetooth device name.

4. The method of claim 1, wherein the filtering of the identities of the plurality of reference devices outputs identities for inclusion in the subset that are determined to match a string of characters or a portion of a string of characters defined by the defined filter pattern.

5. The method of claim 1, wherein the filtering of the identities of the plurality of reference devices outputs identities for inclusion in the subset that are determined to match at least one of: a default value defined by the defined filter pattern, a mobile country code defined by the defined filter pattern, a mobile network code defined by the defined filter pattern, a realm defined by the defined filter pattern, and a public land mobile network identifier defined by the defined filter pattern.

6. The method of claim 1, further comprising:
   checking for receipt of the defined filter pattern from the communications network; and
   responsive to an absence of receipt of the defined filter pattern from the communications network, using at least one default value for the defined filter pattern.

7. The method of claim 1, further comprising:
   determining a geographic location of the mobile terminal;
   communicating a query containing the geographic location through the communications network toward a map server requesting a listing of known business identifiers proximately located to the mobile terminal;
   receiving a response from the map server containing the listing of known business identifiers; and
   generating at least a portion of the defined filter pattern based on the listing of known business identifiers.

8. A mobile terminal comprising:
   at least one processor;
   at least one memory connected to the at least one processor and storing program code for supporting positioning of the mobile terminal by being, when executed by the at least one processor causes the mobile terminal to:
   receive a defined filter pattern from a network node in a communications network or another node of the communications network;
   discover identities of a plurality of reference devices based on signals received from the plurality of reference devices;
   filtering the discovered identities of the plurality of reference devices to obtain a subset of identities of the plurality of reference devices that each satisfy the defined filter pattern; and
   reporting information on the subset of identities of the plurality of reference devices to the network node.

9. The mobile terminal of claim 8, wherein the discovery of identities of the plurality of reference devices based on signals received from the plurality of reference devices comprises discovering the identity of each of the plurality of reference devices based on a signal received from each of the plurality of reference devices.

10. The mobile terminal of claim 8, wherein the identities of the plurality of reference devices that are discovered comprise at least one of: a WLAN basic service set identifier, a WLAN service set identifier, a media access control address, a Bluetooth address, and a Bluetooth device name.

11. The mobile terminal of claim 8, wherein the filtering of the identities of the plurality of reference devices obtains identities for inclusion in the subset that are determined to match a string of characters or a portion of a string of characters defined by the defined filter pattern.

12. The mobile terminal of claim 8, wherein the filtering of the identities of the plurality of reference devices outputs identities for inclusion in the subset that are determined to match at least one of: a default value defined by the defined filter pattern, a mobile country code defined by the defined filter pattern, a mobile network code defined by the defined filter pattern, a realm defined by the defined filter pattern, and a public land mobile network identifier defined by the defined filter pattern.

13. The mobile terminal of claim 8, wherein the memory further stores program code that is executed by the at least one processor to perform further operations comprising:
   checking for receipt of the defined filter pattern from the communications network; and
   responsive to an absence of receipt of the defined filter pattern from the communications network, using at least one default value for the defined filter pattern.

14. The mobile terminal of claim 8, wherein the memory further stores program code that is executed by the at least one processor to perform further operations further comprising:
   determining a geographic location of the mobile terminal;
   communicating a query containing the geographic location through the communications network toward a map server requesting a listing of known business identifiers proximately located to the mobile terminal;
   receiving a response from the map server containing the listing of known business identifiers; and
   generating at least a portion of the defined filter pattern based on the listing of known business identifiers.

15. The mobile terminal of claim 8, wherein the filtering of the identities of the plurality of reference devices outputs identities for inclusion in the subset that are determined to contain at least a defined portion of one of the listing of known business identifiers.

16. A computer program product comprising:
a non-transitory computer readable medium storing program code configured for execution by a processor of a mobile terminal to cause the processor to perform operations for supporting positioning of the mobile terminal, the operations comprising:
receiving a defined filter pattern from a network node in a communications network or another node of the communications network;
discovering a plurality of reference devices based on signals received from the plurality of reference devices;
filtering the discovered identities of the plurality of reference to obtain a subset of identities of the plurality of reference devices that each satisfy the defined filter pattern; and
reporting information on the subset of the identities of the plurality of reference devices to the network node.

17. The computer program product of claim 16, the operations further comprising:
collecting a wireless communication signal measurement for each of the reference devices identified in the subset.

18. The computer program product of claim 16, wherein the identities of the plurality of reference devices that are discovered comprise at least one or more of: a WLAN basic service set identifier, a WLAN service set identifier, a media access control address, a Bluetooth address, and a Bluetooth device name.

19. The computer program product of claim 16, wherein the filtering of the identities of the plurality of reference devices outputs identities for inclusion in the subset that are determined to match a string of characters or a portion of a string of characters defined by the defined filter pattern.

20. The computer program product of claim 16, wherein the filtering of the identities of the plurality of reference devices outputs identities for inclusion in the subset that are determined to match at least one of: a default value defined by the defined filter pattern, a mobile country code defined by the defined filter pattern, a mobile network code defined by the defined filter pattern, a realm defined by the defined filter pattern, and a public land mobile network identifier defined by the defined filter pattern.

* * * * *